United States Patent [19]

Trump et al.

[11] 4,275,418

[45] Jun. 23, 1981

[54] VIDEO NOISE REDUCTION SYSTEMS

[75] Inventors: Martin R. Trump; Peter C. Michael, both of Newbury; Richard J. Taylor, London, all of England

[73] Assignee: Micro Consultants Limited, Berkshire, England

[21] Appl. No.: 73,762

[22] Filed: Sep. 10, 1979

[30] Foreign Application Priority Data

Sep. 14, 1978 [GB] United Kingdom ............... 36839/78

[51] Int. Cl.³ ............................................. H04N 5/21
[52] U.S. Cl. ................................................. 358/167
[58] Field of Search ................. 358/36, 167, 140, 180, 358/160, 11, 22

[56] References Cited

U.S. PATENT DOCUMENTS

| | | | |
|---|---|---|---|
| 3,009,016 | 11/1961 | Graham | 358/167 |
| 4,057,835 | 11/1977 | Kinuhata et al. | 358/140 |
| 4,090,221 | 5/1978 | Connor | 358/167 |
| 4,107,739 | 8/1978 | Rossi et al. | 358/167 |

*Primary Examiner*—John C. Martin
*Attorney, Agent, or Firm*—Dowell & Dowell

[57] ABSTRACT

A video noise reduction system for incoming video information from a plurality of picture points. A first processor is capable of synthesizing each picture point from incoming picture point information from adjacent picture points to provide noise reduced picture information. A store is provided for storing picture information from at least one frame and a second processor is capable of synthesizing each picture point from incoming and stored information from a corresponding picture point from a current and earlier frames to effect noise reduction. A detector is provided to detect any movement between pictures to allow processing by the first processor when movement is occuring and from the second processor when no movement is occuring. A third processor may be provided to allow synthesizing from adjacent picture points from current and earlier pictures to effect noise reduction when the picture content is detected to be stationary and has only low frequency components therein.

13 Claims, 12 Drawing Figures

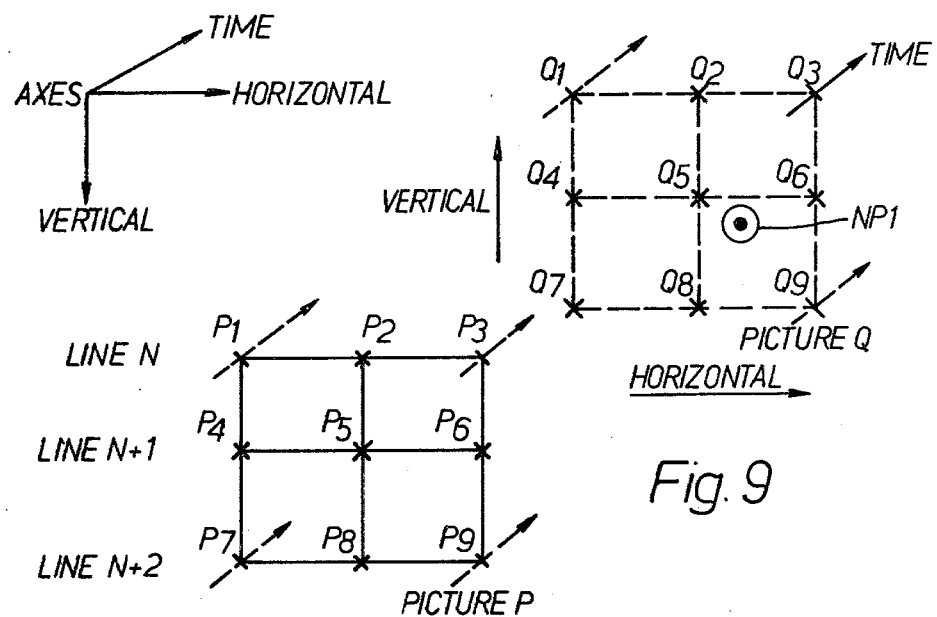
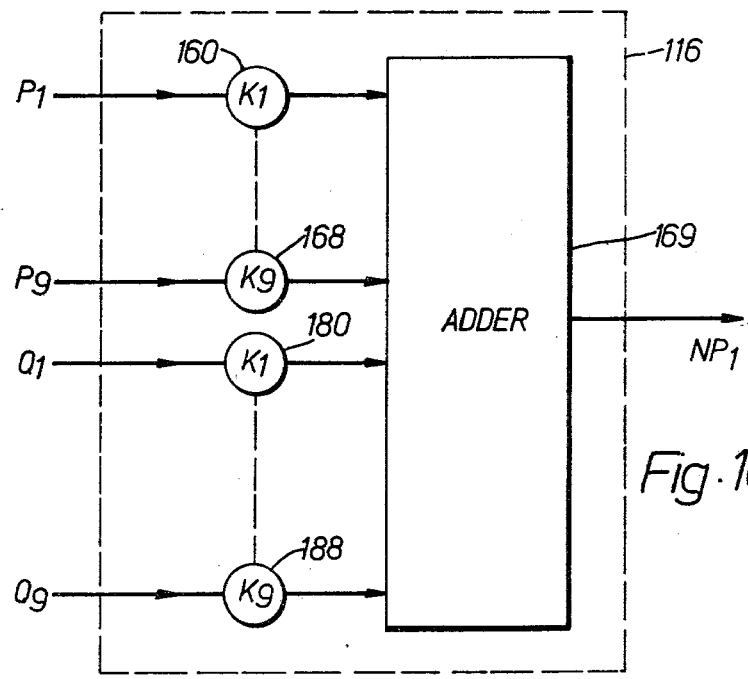
Fig. 9
Fig. 10

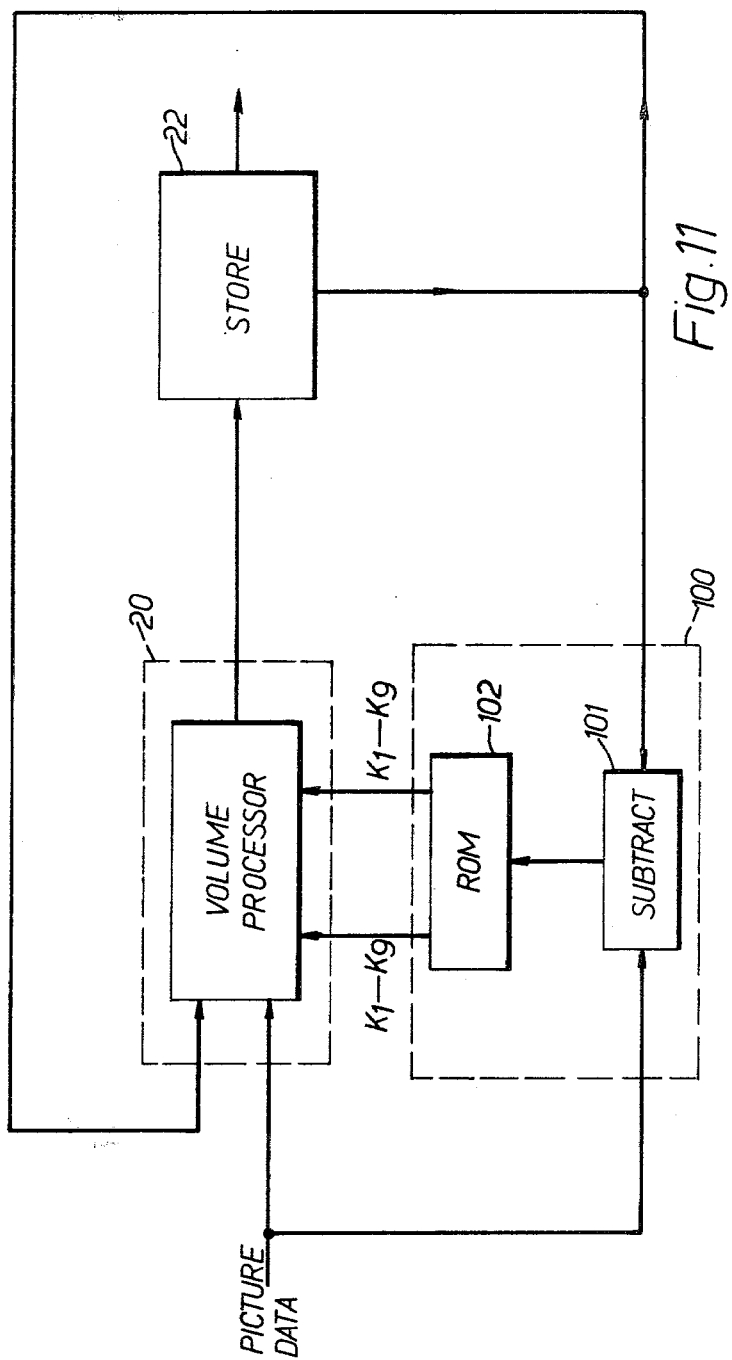

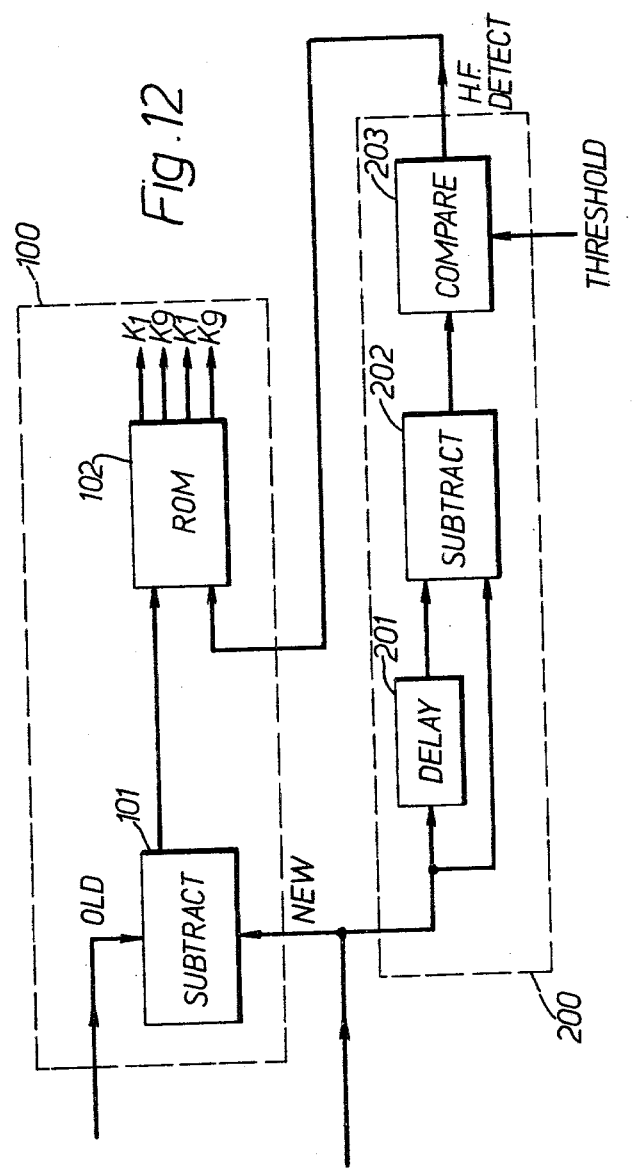

VIDEO NOISE REDUCTION SYSTEMS

BACKGROUND OF THE INVENTION

The present invention is concerned with video noise reduction systems which provide improved image quality on noisy pictures.

In known noise reduction systems for example as disclosed in British patent application No. 42751/76 (U.S. patent application Ser. No. 841,519) the noise reduction mechanism involves storing picture information from at least one field and using this stored information with incoming information to provide modified picture information, picture point by picture point, by adding together a portion of the stored information for the previous picture point with the same picture point from a current field. Because of the generally random nature of picture noise this process reduces the noise content. As this mechanism requires curtailing when any portion of the picture is moving relative to an earlier picture, there is a requirement generally to include a movement detector to control the degree of noise reduction applied to any particular picture point. In the aforementioned patent references, a mechanism for synthesising picture points from information from adjacent picture points is described for use in picture expansion or compression to provide the facility for picture zooming or standards conversion. The adjacent picture points may be from the same or different fields to provide area or volume manipulation. This manipulation may be adaptive so that the portions of adjacent picture point information used in the synthesis may be varied.

The present invention is concerned with extending the use of the adaptive volume manipulator to provide noise reduction. The noise reduction can take place at the same time as synthetic picture information is generated, for example, in a digital standards converter. Alternatively, the noise reduction may be used exclusively when there is no requirement for synthetic picture generation, for example in a digital synchronizer or a stand alone noise reducer system.

SUMMARY OF THE INVENTION

According to the invention there is provided a video noise reduction system for incoming video information derived from a plurality of picture points, said system comprising: first processing means for synthesising each picture point from incoming picture point information from adjacent picture points to provide noise reduced picture information; storage means for storing picture point information from at least one frame; second processing means for synthesising each picture point from incoming and stored picture point information from the corresponding picture point from a current and earlier frames to effect noise reduction; and detector means for detecting movement between pictures to allow processing by said first processing means when the picture information is moving and from said second processing means when the picture information is stationary.

The system may include third processing means for synthesising each picture point from incoming picture point information from adjacent picture points from current and earlier pictures to effect noise reduction; second detector means for detecting high or low frequency components on a stationary picture to allow processing by said second processing means when stationary picture information with high frequency components is detected and from said third processing means when low frequency components are detected in the stationary picture.

Further according to the invention there is provided a method of reducing video noise on incoming picture information derived from a plurality of picture points, said method comprising: detecting movement on each portion of the picture; storing picture information; synthesising each picture point from incoming picture point information from adjacent picture points to provide noise reduction whenever that portion of the picture is moving and synthesising each picture point from incoming and stored picture point information from the corresponding picture point from a current and earlier frames to effect noise reduction when that portion of the picture is stationary.

The method may include detecting high and low frequency components on stationary pictures and synthesising each picture point from incoming picture point information from adjacent picture points from current and earlier pictures to effect noise reduction only when low frequency components are detected.

BRIEF DESCRIPTION OF DRAWINGS

The invention will now be described by way of example with reference to the accompanying drawings, in which:

FIG. 9 shows volume synthesis using information from more than one picture, FIG. 10 shows one arrangement for the volume processor, FIG. 11 shows one arrangement for the present noise reduction system capable of different types of synthesis, and FIG. 12 shows a movement detector system capable of detecting high frequency components.

DESCRIPTION OF PREFERRED EMBODIMENTS

Figure 1:
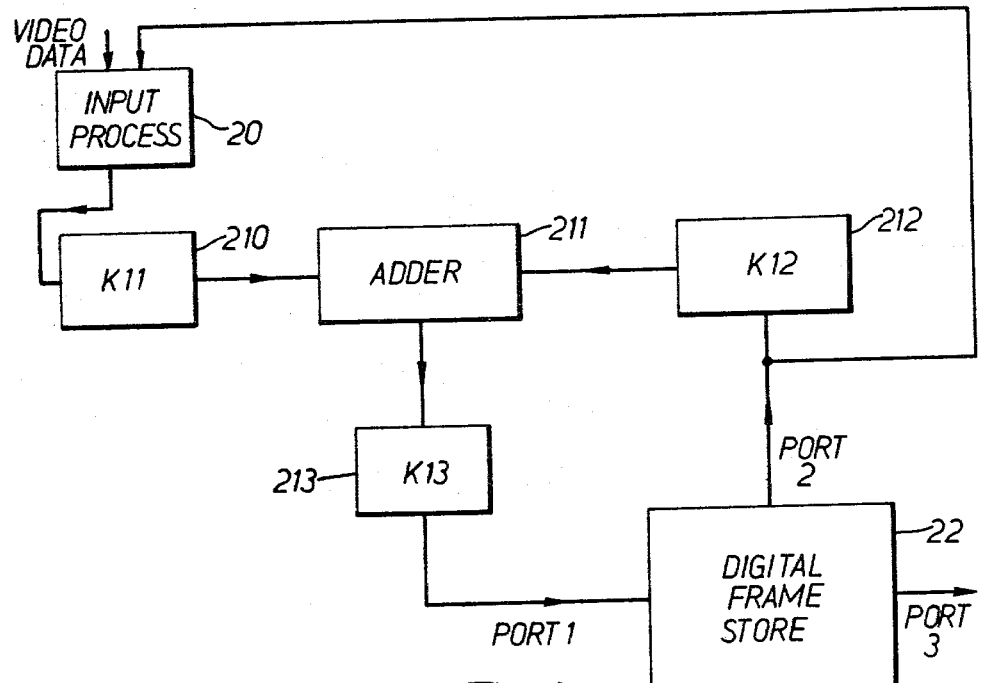
FIG. 1 shows a known processing system which includes a noise reduction mechanism.

The arrangement of FIG. 1 shows the known processing system described in British patent application No. 42751/76 (U.S. patent application Ser. No. 841,519). (U.S. Pat. No. 4,163,249).

Incoming video data is applied to an input processor 20. The incoming video will be in digital form, first having been converted from analogue form as necessary. The input processor 20 effects the synthesis of picture points from adjacent picture point information from at least one field. The number of picture points synthesised can be controlled to be greater or smaller than the original number of picture points for a particular field or frame thus effecting expansion or compression to provide picture zoom or standards conversion. For example, PAL to NTSC standards conversion will require taking an incoming line standard of 625 lines per frame and converting this to an outgoing standard of 525 lines per frame. Thus the number of lines is reduced and is comparable with a fixed amount of compression. A way in which the picture points can be synthesised within processor 20 will be described in more detail later, but the noise reduction system of the present invention can use this processing in addition to the normal type noise reduction processing concerned with the remainder of FIG. 1, to provide an improved system, regardless of whether the picture size is changed or remains fixed such as in a video synchroniser.

The known noise reduction arrangement can be considered as receiving video data (which may or may not have been previously processed) at the input to coefficient modifier 210. Each of the signal paths carrying video data will be capable of carrying at least 8 bit wide video data operating at a clock rate typically 15 MHz.

New video data is applied to coefficient modifier 210 for K11. Modifier 210 takes a proportion of the incoming video information (dependent on the value of K11 selected) and applies it to a digital adder 211. A second input to the digital adder is provided by previously stored video information after modification by coefficient modifier 212 for K12.

The output from the digital adder is applied to coefficient modifier 213 for K13 for application to the video store 22 at port 1.

Port 1 is an input port to the digital frame store capable of carrying a full frame of television information where each storage location is wider than 8 bits. In a practical system a total of 12 bits may be used at each location in the video store. Such a video store would in practice have a capacity of approximately 6 megabits. The video store has a minimum of a single input port and a single output port. More typically the video store will have three ports, one of which is an input port whilst the second two are output ports. The arrangement of the store will enable the input and output to run non-synchronously with respect to television field and line rates. Port 2 will be capable of running synchronously with port 1 so that video data stored at the same picture location from a previous field may be accessed at the same time as new information for the same picture point is available in the next field.

Thus access to the top left hand picture element of field 1 is available from port 2 at the same time that the top left hand element of field 3 is available on the new video data input.

A video store of this type is described in detail in British application No. 6585/75 (u.S. patent application Ser. No. 764,148, now U.S. Pat. No. 4,183,058) for example.

In a simple system the values of the coefficients would be fixed so that the portions of the previous data and incoming data would have a predetermined relationship.

If the incoming video information is stationary—for example a test card transmission—coefficients k11, k12 and k13 may be set to a fixed value for optimum noise reduction. Typical examples of the coefficients under these conditions are:

k11 = 1.125
k12 = 0.875
k13 = 1.0

However, a conflict exists between the requirements for noise reduction in which the maximum integration time should be used and the requirement that the picture shall maintain movement portrayal without distortion.

The latter—movement portrayal requires the minimum integration time. Thus it is desirable to provide an adaptive mechanism which is sufficiently intelligent to adjust the coefficients for variable integration time depending upon picture content using a movement detector.

If part of the picture is stationary whilst part remains moving in order to obtain effective noise reduction over the stationary part of the picture whilst allowing movement portrayal without distortion, it becomes necessary to modify k11, k12 and k13 on a picture point by picture point basis.

Whilst a simple movement detector may be constructed using a subtractor and comparator and is adequate for detection of movement in some systems (e.g. picture compression) in noise reduction systems it has been found that adjustment to threshold levels and coefficient settings are required if the system is to operate satisfactorily.

Figure 2:
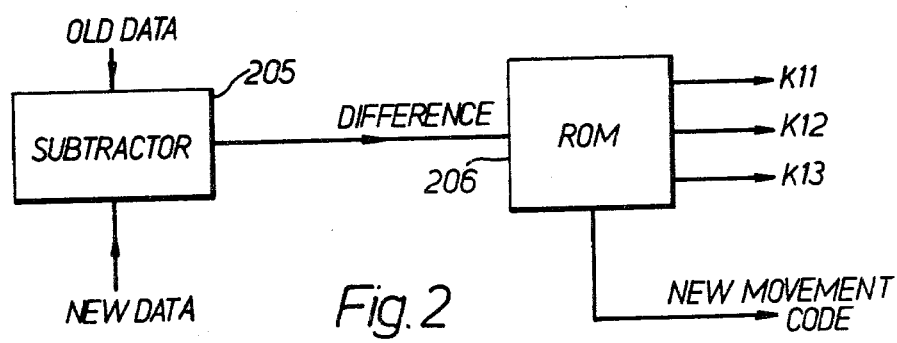
FIG. 2 shows one arrangement for a movement detector system.

To overcome this problem an alternative arrangement for the movement detector is shown in FIG. 2 and as described for use in the aforementioned system. A read only memory (ROM) 206 is provided in place of the comparator and a subtractor 205 is used in a similar manner to the simple arrangement using a subtractor and comparator. The mode of operation of a ROM and construction thereof is well known. The difference signal is now used to address the read only memory which contains various coefficients of k11, k12 and k13 in fixed storage locations. Large movements are differentiated from small movements and a sliding scale of coefficients k11, k12 and k13 is provided on a real time basis. A movement code can be generated by the ROM indicative of the degree of movement to be used by other parts of the video system if required and as used for example in an adaptive volume processor (similar to processor 20 of FIG. 1 but provided at the output side of the system as described in the aforementioned patent applications). The movement code can be stored with the normal video data in store 22.

Figure 3:
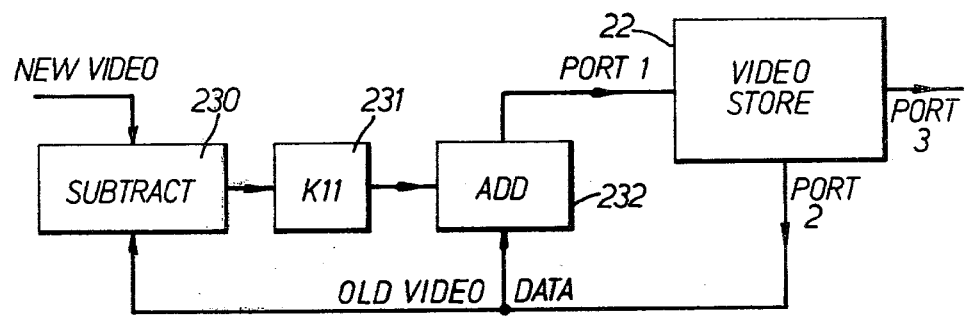
FIGS. 3 and 4 shows alternative noise reduction systems.
Figure 4:
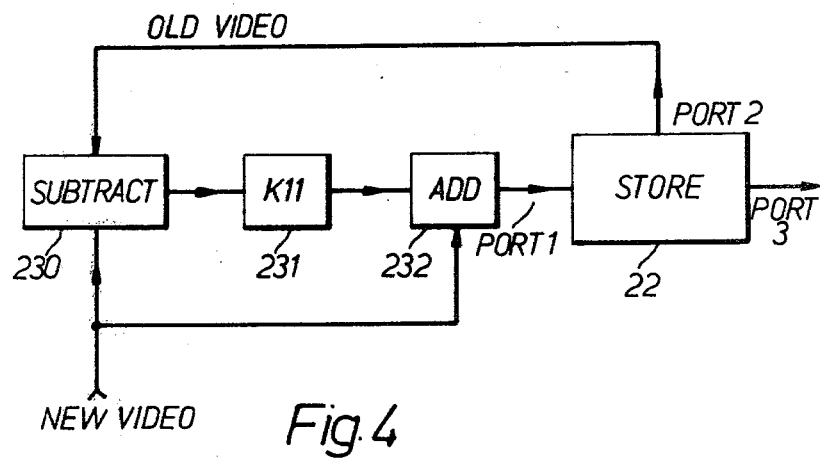

Alternative noise reduction schemes can more simply use a single coefficient modifier as shown in FIGS. 3 and 4.

The implementation of FIG. 3 makes use of the general requirement that coefficient k11 is equal to 1 minus coefficient k12 for general purpose noise reduction i.e.

$$k11 = 1 - k12$$

In this arrangement subtractor 230 receives the new video at one input and the previous video at a second input. The output is modified by coefficient k11 in modifier 231. This output is passed to one input of adder 232 which adds this to the previous data from store 22. In such a scheme the ROM 206 of FIG. 2 will be implemented to provide only one coefficient.

An alternative noise reduction scheme also using one multiplier (k11) is shown in FIG. 12. In this arrangement the new video data goes to both the subtractor 230 and adder 232 and the previous video to the subtractor 230 only.

Whilst each of the systems of FIGS. 1, 3 and 4 makes use of a video store which is capable of integrating a number of pictures, so that the noise is averaged towards zero, integration occurs in the time axis only. Thus the picture is broken up into a series of picture points typically between 512 and 1,024 per line. In store, each picture point is allocated a location and the contents of the location is added to by information from succeeding pictures taken at the same point.

The present system now to be described uses the above type of noise reduction mechanism selectively in conjunction with noise reduction using picture point synthesis.

Figure 5:
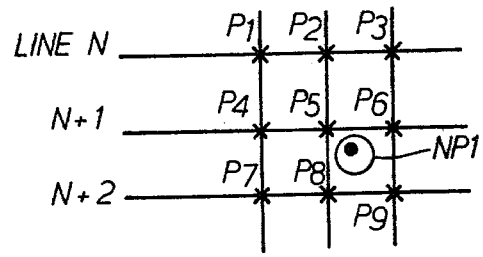
FIG. 5 shows picture point synthesis from adjacent picture points.

The processing function of processor 20 of FIG. 1 will now be described in relation to area processing which takes into account information from surrounding picture points (i.e. area manipulation), as shown in FIG. 5 to synthesise new picture points for picture zoom or standards conversion requirements.

The basic requirement is the synthesis of a picture point which did not exist as a picture point on the incoming video data. The engineer aims at producing the best estimate of the likely value of a picture point by examining picture points around the synthesised picture point and either adding or subtracting various proportions of them to produce the best result.

Successive picture points P1 to P9 on adjacent lines N, N+1 and N+2 are applied to the input processor. Each of the points P1 through P9 is modified by coefficient K1 through K9. The resultant sum is a new picture point designated NP1 where $$NP1 = K1P1 + K2P2 + K3P3 \ldots \text{etc through } K9P9$$

If the input area processor function is operating to reduce the picture size for compressed pictures the output data may appear more slowly than the input data. Thus for compression, the number of new picture points produced will be less than the original number of picture points but each new picture point will be derived from data on the nearest 9 picture points. How the processor effects this function will now be described.

In order to reduce the size of a standard television picture, interpolation is needed across the picture area. In the system described the total television picture is broken up into a number of picture points. The picture could typically be broken into 512 picture points per line for a 525 line picture. The area process function is effected for new picture point NP1 by the expression $$NP1 = K1\ P1 + K2\ P2 \ldots K9\ P9$$

Figure 6:
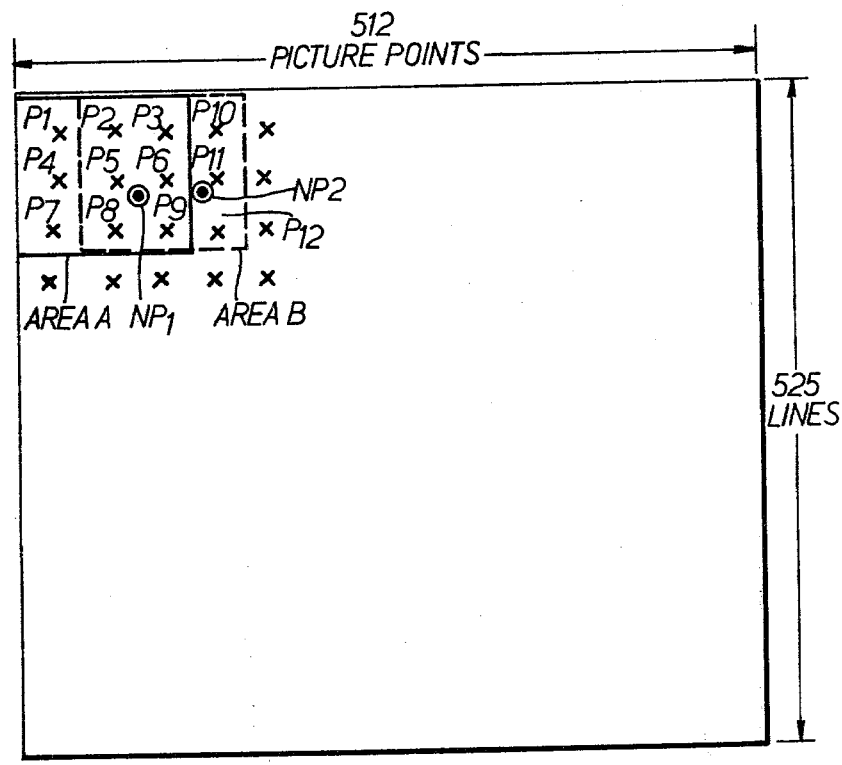
FIG. 6 shows further steps in picture synthesis.

This area is designated Area A in FIG. 6. When calculating the next picture point NP2 (say) the values of coefficients K1 to K9 for Area B will be different to those for Area A thus $$NP1 = K1A\ P1 + K2A\ P2 + K3A\ P2 + \ldots K9A\ P9$$
and
$$NP2 = K1B\ P2 + K2B\ P3 + K3B\ P10 + \ldots K9B\ P12.$$

Thus the input area process remains the same but the coefficients K1 through K9 are variable.

The operation of area interpolation occurs in real time and as the data represents incoming information scanned horizontally the coefficients K1 through K9 have to change across the length of 1 television line. In the system described the switch occurs between picture points.

In the same way vertically the boundaries between the lines represent coefficient changes. Each new picture point is computed from information available from the nearest 9 picture points to that new picture point.

In order to switch coefficients between the picture point boundaries horizontally excess look-up tables may be provided within the basic system. However as it is possible to re-load data into the look-up tables when they are not in use it is possible to implement the system utilising only one complete set of excess look-up tables. (Look-up tables have already been described in effect with regard to coefficients K11–k13 using ROM 206 to select a coefficient value in dependence on the input signal received.)

Figure 7:
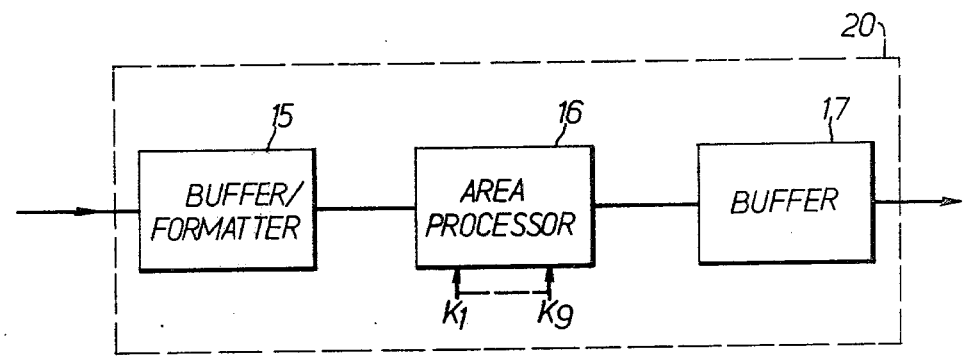
FIG. 7 shows one arrangement for providing area processing.

FIG. 7 shows the area processing function of processor 20.

The digital video data (e.g. 8 bit wide) is applied to a process input formatter 15 which formatter accepts the digital data stream in the order presented, stores it and represents it so that the input area processor 16 may operate on the signal.

The input area processor 16 is an area processing operation which accepts a number of picture points from adjacent lines horizontally and adjacent points vertically. As just described a coefficient is applied to each of the input points and the resultant output is a single data word for each new picture point which is the sum of various proportions of the input data points over the area being processed. The required compression coefficients K1 to K9 are stored in a coefficient store (e.g. ROM). For standards conversion the degree of compression (or expansion) will be fixed.

The input processor buffer store 17 accepts data from the area processor 16 at the rate presented and re-formats it for handling by the other elements in the system.

Figure 8:
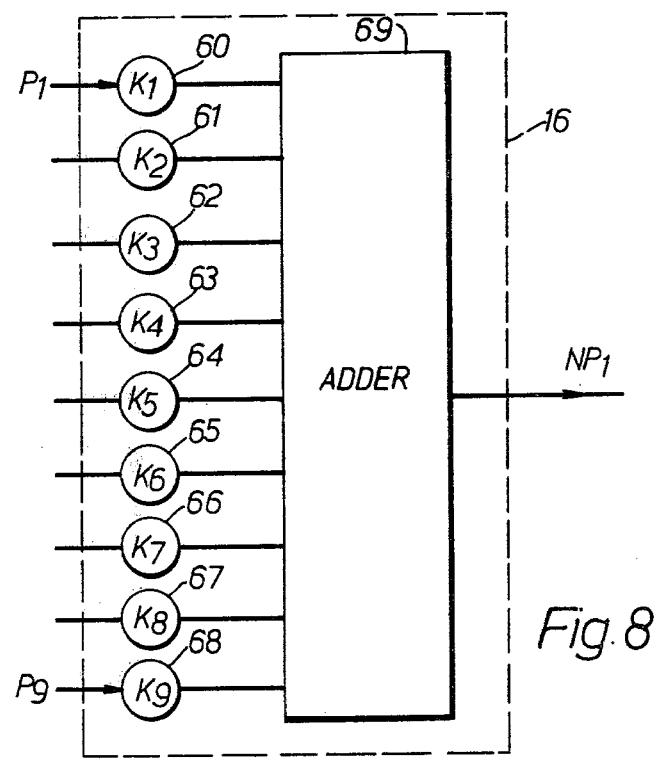
FIG. 8 shows an embodiment of the processor in more detail.

The area processor 16 is shown in detail in FIG. 8. Multipliers 60–68 each receive data on one picture point (P1–P9) and multiply the data by coefficients K1 to K9 respectively, which coefficients will each be variable but preset. The modified data is added in adder 69 which comprises a 9 input×8 bit digital adder. The output from adder 69 will be the new picture point NP1.

The coefficient multipler function of area processor 16 (i.e. multipliers 60–68) can be effected by using random access memories (RAM). Nine such multipliers would be provided.

The area processing function can be expanded to handle volume manipulation by using information from more than one picture. Volume manipulation adds another dimension to the matrix of picture points which may be used. Area manipulation used only horizontal and vertical dimensions. Volume manipulation uses horizontal, vertical and time dimensions. The synthesis of a new picture point using volume manipulation makes use not only of the adjacent picture points in the horizontal and vertical dimension of one picture but also of information coming from the next picture or series of pictures.

FIG. 9 shows a 3×3×2 volume manipulation matrix. In each of two successive fields (successive pictures P and Q) 9 picture points P1 to P9 and Q1 to Q9 are defined. These 18 points are those closest to the new picture point NP1 to by synthesised together with picture points some little distance away. Thus P1 to P9 are the original picture points on picture P and Q1 to Q9 are the picture points on picture Q.

The new picture point is calculated from the expression below $$NP1 = K1P1 + K2P2 + K3P3 + K4P4 + K5P5 + K6P6 + \\ K7P7 + K8P8 + K9P9 + k1Q1 + k2Q2 + k3Q3 + \\ k4Q4 + k5Q5 + k6Q6 + k7Q7 + k8Q8 + k9Q9$$

The way in which addition and multiplication can be effected has already been described. The system is expanded however to handle the additional coefficients and picture points.

A circuit which could be used to implement the solution for NP1 is 18 separate real time multipliers feeding into an 18 input adder. Such an arrangement is shown in FIG. 10. Volume processor 116 comprises multipliers 160 to 168 for the picture points P1 to P9 and multipliers 180 to 188 for picture points Q1 to Q9. The multiplier outputs are connected to adder 169. Serial operation of some multipliers and adders may be utilised or a combination of serial-parallel adding and multiplication may be used. As already described the volume manipulation has previously been used for picture point synthesis to enlarge or reduce the size of the television picture.

Simple volume manipulation utilises approximately the same amount of information from both picture P and picture Q. The percentage utilised from each picture varies over the screen and depends upon the magnification or size reduction operating at any time. K1 to K9 and k1 to k9 are caused to vary depending upon the magnification or size reduction demanded. This mode of operation is generally similar to the area manipulation except that the picture points from picture Q are included.

'Adaptive' volume manipulation reduces the proportion of picture P utilised to generate the synthesised picture point in P1. K1 to K9 are reduced to a low value and k1 to k9 are increased in value under conditions when picture degradation due to picture movement would be caused (i.e. a greater proportion of picture Q is used). Such movement is detected using a movement detector as before.

During the course of development of the adaptive volume manipulator used for picture point synthesis, noise reduction effects were observed. Noise reduction occurs due to the integration of data from surrounding picture points on a three-dimensional basis. Thus, information displayed in one point has contents which come from an integration of the proceding similar points, plus components from surrounding points in the current and preceding pictures when use is made of the present noise reduction system. As the present noise reduction system is not concerned with picture enlargement or compression, the picture synthesis can result in a similar configuration to the incoming picture. This can be seen from FIG. 9 in that NP1 could effectively be in the position of point Q5 and be (in the case of area processing only) determined from points Q1 to Q9. In the case of volume processing then NP1 uses data from points P1 to P9 also. It can also be seen that the mechanism used for earlier noise reduction schemes such as FIGS. 3 and 4 can be realised within the volume processing function so that picture point NP1 in the position Q5 would provide the single picture point function for noise reduction by using only points Q5 and P5.

Thus the processor 116 of FIG. 10 can be used to provide the area, volume or time only function (i.e. a single picture point from pictures P and Q) by suitable selection of coefficients k1-k9 abnd K1-K9. If the coefficients for P1 to P9 are all selected to be other than zero then the area function is obtained. If the coefficients for Q1 to Q9 are also all selected to be other than zero then the volume function is obtained. If only the coefficients for P5 and Q5 are selected to be other than zero then only the time integration function is obtained. A coefficient storage ROM can be used in a similar manner to that of FIG. 2 to store a table of coefficients and these can be accessed to provide the desired coefficient for use with a particular multiplier 160-168 and 180-188.

The adaptive volume manipulator arithmetic function may be optimized for noise reduction by utilising a different set of coefficients depending upon the contents of the picture both in space and in time. Movement detection already described provides the necessary information on picture changes and the present system incorporating a movement detector is shown in FIG. 11. The movement detector 100 is shown as comprising a subtractor and ROM 102. Any picture movement is detected by subtractor 101 as a difference level and this difference is used to address the ROM 102 to output a stored coefficient for use in the multipliers of processor 116. Naturally, the coefficients will be selected for storage so that the greater degree of difference detected will access locations with coefficients which will reduce the amount of picture information used from an earlier picture to prevent smearing. Thus in the case of a large amount of picture movement the output coefficient will in effect cause the picture point to be synthesised from area information, see FIG. 9 (i.e. vertical and horizontal picture information only). When no movement is occurring then information can be used from time (i.e. an earlier picture also).

It has however been found that an improvement can be afforded by distinguishing between stationary picture points which have high frequency or low frequency components to only allow integration in the time axis (i.e. using a single picture point from more than one picture).

A separate detector is used to compute the high frequency component of the image whilst stationary. A simple high frequency detector is a high pass digital filter and threshold operating along a line. When the difference between succeeding points along the line exceeds a given threshold, high frequency components are indicated. Such a system is shown in FIG. 12 in conjunction with the other detector. The high frequency component detector 200 includes a subtractor 202 which receives the video directly at one input and via delay 201 at its other input any difference is input to comparator 203 which compares this level with a predetermined threshold and if exceeded determines that a high frequency component is present. This output is used to prevent the ROM providing coefficients other than zero for the associated picture points so that only a single picture point from each picture is effectively used for integration (i.e. time axis only) during stationary parts of the picture with high frequency components. The high frequency detector 200 is used for horizontal and vertical axes. In the horizontal direction delay 201 is chosen to provide a delay of a few picture points. Along the vertical axis, the delay is an integral number of lines.

The processor 20 may be provided at the input or output side of the system and may form part of a distributed store and processor which comprises separate store sectors and processors to allow more rapid processing to be achieved along the lines disclosed in U.S. patent application Ser. No. 841,519 and U.S. Pat. No. 015,678. Although the area processed has been described by comprising an area of 9 picture points other configurations could be used from just a few picture points from one or more lines upwards.

The basic volume integration described above causes a visible reduction in spatial resolution and in effect the pictures become soft when the integrator is in use. The high frequency picture component detector described above adjusts the coefficients within the volume manipulator, so that volume integration does not take place in the presence of high frequencies on stationary pictures.

Utilizing the mechanism described above, it is possible to increase the range of noise reduction obtained on pictures without disturbing movement portrayal.

One defect which has been observed in earlier systems is that at the junction between moving and stationary images noise reduction does not take place and a noise "halo" is observed around the image. Some viewers have commented that the noise "halo" causes an objectionable visual disturbance in an otherwise perfect picture.

The modification to the adaptive volume manipulator just described may be used to reduce the effect of the noise halo, which suits some viewers with certain material. The adaptive mechanisms provided by this system have provided a method of accommodating the requirements of the majority of viewers over a wide range of material.

Essentially alternative forms of noise reduction are used in the area shere the "halo" would be present, i.e. where movement has taken place. Thus when movement is detected and the temporal filtering by integration of picture points between one frame and another has to be turned off as a substitute spatial filtering within the same field is employed subjective tests show that the consequentially loss of resolution in only the moved portions of the picture goes un-noticed by the viewer and the resultant reduction of the noise "halo" produces a significant improvement in subjective quality.

The volume integrator described above is modified in the presence of movement, so that integration takes place in only the horizontal and vertical dimension from picture points which surround the synthesised picture point, but with no contribution from preceding pictures. This function is only applied at the time that movement has been detected. During movement, high frequency components are of less consequence to the viewer and the resultant image is not detected as lacking in definition.

So, there are three identifiable noise reduction mechanism in operation under various conditions of picture input.

1. During stationary images which contain high frequency components, integration in the time axis only is permitted.

2. During stationary images, which do not contain high frequency information, integration takes place in the time, horizontal and vertical axes.

3. During movement, integration takes place in the horizontal and vertical axes only.

We claim:

1. A video noise reduction system for incoming video information derived from a plurality of picture points, said system comprising:
   first processing means for synthesising each picture point from incoming picture point information from adjacent picture points to provide noise reduced picture information;
   storage means for storing picture point information from at least one frame;
   second processing means for synthesising each picture point from incoming and stored picture point information from the corresponding picture point from a current and at least one earlier frame to effect noise reduction; and
   detector means for detecting on each portion of the picture any movement between pictures to allow processing by said first processing means during portions of the picture when the picture information is moving and by said second processing means during portions of the picture when the picture information is stationary.

2. A system according to claim 1, including third processing means for synthesising each picture point from incoming picture point information from adjacent picture points from current and earlier pictures to effect noise reduction; second detector means for detecting high or low frequency components on a stationary picture to allow processing by said second processing means when stationary picture information with high frequency components is detected and by said third processing means when only low frequency components are detected in the stationary picture.

3. A system according to claim 2, wherein the first, second and third processing means each comprise adders and multipliers for effecting the picture point synthesis.

4. A system according to claim 2, wherein the first, second and third processing means comprise a common processor including multipliers and adders capable of providing all three processing functions.

5. A system according to claim 2, wherein the second detector means comprises a delay element, a subtractor for receiving incoming and delayed video information and a comparator for determining when the subtractor output exceeds a threshold level.

6. A system according to claim 1, wherein coefficient storage means are provided to provide a coefficient for use by each of the processing means in dependence on any movement detected by the detector means.

7. A system according to claim 6, wherein the coefficient storage means comprises a read only memory.

8. A system according to claim 1, wherein holding means are provided for receiving and holding a plurality of picture points for use by the first processing means.

9. A system according to claim 8, wherein the holding means comprises a buffer store and formatter.

10. A method of reducing video noise on incoming picture information derived from a plurality of picture points, said method comprising:
    detecting movement on each portion of the picture;
    storing picture information from at least one frame;
    synthesising each picture point from incoming picture point information from adjacent picture points to provide noise reduction whenever that portion of the picture is moving and synthesising each picture point from incoming and stored picture point information from the corresponding picture point from a current and at least one earlier frame to effect noise reduction when that portion of the picture is stationary.

11. A method according to claim 10, including detecting high and low frequency components on stationary pictures and synthesising each picture point from incoming picture point information from adjacent picture points from current and earlier pictures to effect noise reduction when only low frequency components are detected.

12. A method according to claim 10, wherein the synthesising steps are effected by multiplication by a selected coefficient and addition.

13. A method according to claim 12, including the steps of storing a number of coefficients and selecting a desired coefficient in dependence on any movement detected.

* * * * *